United States Patent [19]

Fontecchio

[11] Patent Number: 5,222,932
[45] Date of Patent: Jun. 29, 1993

[54] AIR BAG AND METHOD OF MANUFACTURE

[75] Inventor: Robert P. Fontecchio, Rochester Hills, Mich.

[73] Assignee: Allied-Signal Inc., Morris Township, Morris County, N.J.

[21] Appl. No.: 735,418

[22] Filed: Jul. 25, 1991

[51] Int. Cl.⁵ .................................................. B31B 1/68
[52] U.S. Cl. .................................. 493/210; 112/441; 112/262.1; 493/379; 493/384
[58] Field of Search ............... 493/186, 210, 379, 380, 493/381, 384; 112/440, 441, 262.1

[56] References Cited

U.S. PATENT DOCUMENTS

| | | | |
|---|---|---|---|
| 2,415,375 | 2/1947 | Sedgley | 112/441 |
| 4,300,894 | 11/1981 | Cumming | 493/210 |
| 4,989,525 | 2/1991 | Portilla | 112/262.2 |
| 5,022,675 | 6/1991 | Zelenak, Jr. | 493/186 |

*Primary Examiner*—Bruce M. Kisliuk
*Assistant Examiner*—Jack Lavinder

[57] ABSTRACT

A method of assembling an air bag comprising the steps of: providing at least one piece of material used to form the air bag; placing generally near a first edge of the material which is to be sewn a series of target markings; providing generally near a second edge of material to be sewn to the first edge a series of indicator markings; overlaying the first and second edges together; and sewing the edges together along a preferred sew line such that the indicator markings fall within the target markings.

6 Claims, 1 Drawing Sheet

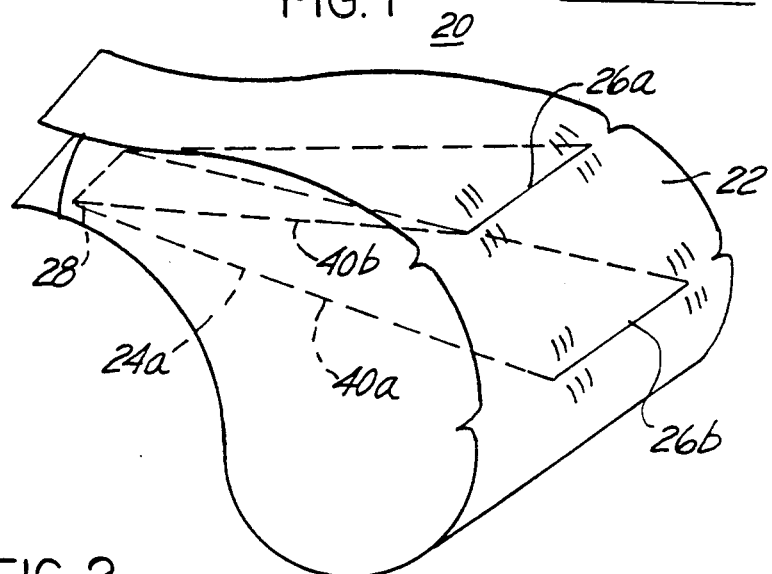
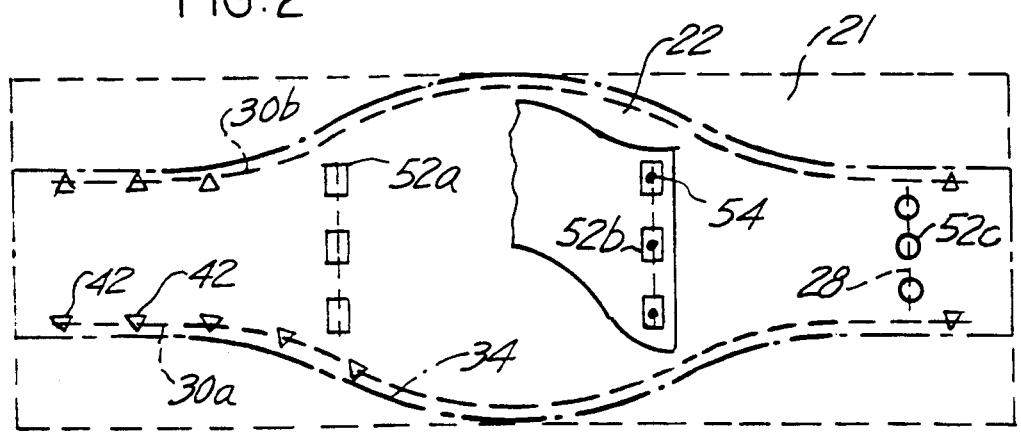
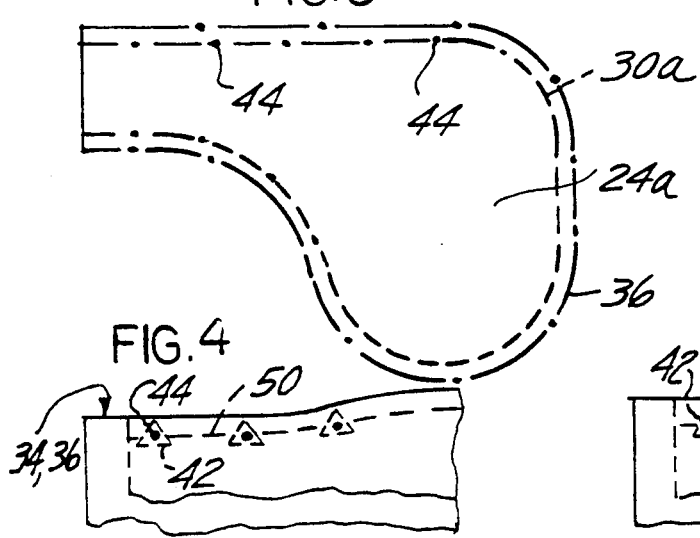
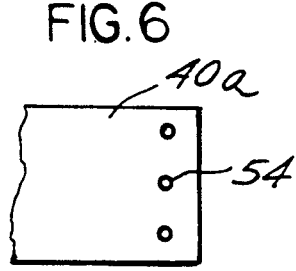
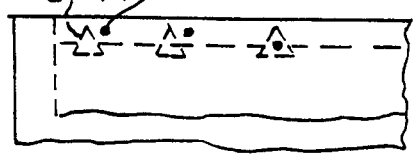

AIR BAG AND METHOD OF MANUFACTURE

BACKGROUND AND SUMMARY OF THE INVENTION

The present invention relates to an air bag for use in a passenger safety restraint system and more particularly to an air bag constructed using an improved method of manufacture.

Typically, air bags are constructed of one or more panels of synthetic material such as nylon or polyester having specified weave densities. The various panels are typically sewn together along predetermined sew lines. Upon completion of the sewing operation, the air bag is turned inside out so that the sewed seams are internal to the air bag. Thereafter, the air bag is folded in a prescribed manner so that it can be stored in a deflated, folded condition. If the air bag includes tethers these tethers are often constructed of the similar material and sewn to one or more of the panels of the air bag.

The present invention provides a means of facilitating the sewing of the panels and of verifying whether or not the various panels of the air bag have been sewn together correctly.

Accordingly, the invention comprises: an air bag and method of assembling same. The method comprises the steps of: providing at least one piece of material, placing generally near a first edge of the material a series of target markings; providing generally near an edge of another piece of material a series of indicator markings; overlaying the pieces of material and sewing together along a preferred sew line such that the indicator markings fall within the target markings.

Many changes and modifications in the above described embodiment of the invention can, of course, be carried out without departing from the scope thereof. Accordingly, that scope is intended to be limited only by the scope of the appended claims.

BRIEF DESCRIPTION OF THE DRAWINGS

In the drawings:

FIG. 1 illustrates a completed air bag.
FIG. 2 illustrates a view of an air bag panel.
FIG. 3 illustrates a side panel.
FIG. 4 illustrates a correctly sewn seam.
FIG. 5 illustrates an incorrectly sewn seam.
FIG. 6 illustrates a portion of a tether.

DETAILED DESCRIPTION OF THE DRAWINGS

FIG. 1 illustrates a typical prior art passenger side air bag 20 comprising a main panel 22 and two side panels 24a and 24b. Only side panel 24a is shown in FIG. 1. Visible on the passenger facing side of the main panel 22 are sew lines 26a and 26b which indicate the location of the tethers 40a and 40b to the main panel 22. The other ends of the tethers can be jointly sewn to one portion of the main panel designated by line 28 as shown in FIG. 1. For the purposes of illustration the resulting air bag is substantially similar to that shown in the commonly owned U.S. Pat. No. 5,022,675 which is incorporated herein by reference. This type of air bag is typically used on the passenger side of a vehicle. As will be seen, the present invention can be used in air bags for driver protection as well as for passenger protection.

As can be seen from the prior art, it is very difficult to ascertain whether or not the actual sew line conforms identically with the desired sew line. This is especially true with regard to the completed air bag which is often asymmetrically shaped. In the prior art the main panel and side panel are placed together such that their respective edges overlay each other and the two panels are sewn together. If the actual sewing line deviates from the desired sew line, the size of the bag may differ from its nominal size.

The present invention overcomes the above deficiency. FIGS. 2 and 3 illustrate top plan views of various pieces of material 21 used to form the main panel 22 and one of the side panels such as 24a in accordance with the present invention. The shape of each panel is shown in broken line. The side panels 24a and 24b are sewn to the main panel 22 along desired sew lines 30a and 30b. A series of target markings 42 (see FIG. 2) are spaced along the desired sew lines 30a and 30b such as on the material 21 used to form panel 22. Another set of indicator markings 44 (see FIG. 3) are placed on the material used to form the side panels and are located along the desired sew line 30a. The spacing between sets of indicator markings 42 and corresponding sets of target markings 44 is substantially identical, however, this spacing need not be constant. In addition, the number of target and indicator markings are preferably the same. As shown, each target marking comprises a generally open design such as the triangular shape shown in FIG. 2. Alternate shapes such as circles, squares, rectangles, etc. are acceptable. Typically, the indicator markings 42 are smaller in size so that they can be circumscribed by the target marking. As shown in the figures the indicator markings can be closed markings such as the filled-in circles 42 shown in FIG. 3. These markings as well as the overall shape of each panel defined by edges 34 and 36 may be marked onto the larger piece of air bag material 21 by silk screening, painting, laser marking or by scorching using a heated implement. In this way the various target and indicator markings can be accurately registered to the material forming the panels 22 and 24a and/or 24b prior to cutting. One purpose of defining the overall shape of any panel on the material is to provide guide lines from which the panels can be cut or stamped prior to sewing. It should be appreciated that the outline of the various panels need not also be placed on the air bag material. This is because the set of indicator and target markings generally define the panel shape. As such, the panels can be cut from the larger piece of material by following the path of these various markings and cutting the material at a given distance from these markings. Further, in a mass production mode of operation the accuracy and placement of the various set of markings 42 and 44 can be periodically checked by overlaying a template (not shown) upon the material.

As previously mentioned, the present invention has specific application for the fabrication of an air bag. Many air bags are fabricated of a nylon such as 420, 630 or 840 denier having weave densities which vary from 32×32 to 72×46. This type of air bag material is known to be somewhat semi-transparent. This semi-transparency is a result of the weave density and color of the fibers of the material. The color of the fibers used for the air bag is typically white or another light color. Reference is made to FIG. 4 which shows certain steps in the fabrication of the air bag 20. As illustrated the main panel 22 is laid flat and a portion of the side panel 24a is overlaid upon the main panel such that its edges 34 and 36 are colinear. In this orientation it can be appreciated that the target markings 42 which are defined on the main panel 22 can be seen through the semi-transparent top layer of material, i.e., the side panel. In this orientation the corresponding indicator markings such as 44 are circumscribed by the corresponding target markings 42. With the two pieces of air bag material in this configuration, they are sewn together defining the actual sew line 50. If the material used for the air bag is opaque rather than transparent the target and indicator markings would be placed on facing surfaces of the various panels 22, 24a and 24b. The various markings are then registered one to the other and sewn together. If the sewing operation is correct, then during the later inspection of the sewn together panels it is easy to verify that each indicator marking falls within the boundaries of its corresponding target marking. FIG. 5 illustrates a situation in which the panels have been sewn together in a less than ideal manner, that is, at least one of the indicator markings 44 does not lie within the boundary of its corresponding target marking 42. If this deviation is beyond the allowable specifications during the fabrication process, then during inspection of the sewn together air bag this air bag can be rejected and perhaps disassembled and thereafter resewn.

To maintain the accuracy of the sewing of the tethers to the main panel 22, additional sets of target and indicator markings can be use. As an example, the main panel 22 can include sets of tether target marking 52a,b and c situated along the desired sew lines 26a, 26b and 28 as shown in FIG. 2. In addition, each tether 40a and 40b can include indicator markings (or alternatively, target markings) such as 54 as shown in FIG. 6. Reference is briefly made to FIG. 2 which also illustrates a portion of a tether such as 40a sewn to and elevated above the panel 22.

Many changes and modifications in the above described embodiment of the invention can, of course, be carried out without departing from the scope thereof. Accordingly, that scope is intended to be limited only by the scope of the appended claims.

I claim:

1. A method of assembling an air bag comprising the steps of:
   placing on at least one edge of a piece of material suitable for use as an air bag a series of target markings;
   placing at least one edge of another piece of material suitable for use as an air bag a series of indicator markings;
   overlaying the pieces of material such that the indicator markings align with corresponding target markings and fall on the target markings in order to provide a preferred sew line pattern for making the bag; and
   sewing the pieces of material together along the preferred sew line pattern to form a bag.

2. The method as defined in claim 1 wherein each indicator marking is smaller than its corresponding target marking.

3. The method as defined in claim 1 including the step of inspecting the sewn air bag to determine if each indicator mark lies within a corresponding target marking.

4. The method as defined in claim 1 wherein the step of overlaying includes positioning an indicator marking on a transparent piece of material such that it is within a visible boundary defined by the corresponding target marking.

5. The method as defined in claim 1 wherein the air bag includes a panel and a tether sewn to the panel at least at one location; the method including the steps of:
   providing a series of second target markings on one of the panel and the tether to indicate the desired location of the tether sew line,
   positioning the tether relative to the second target markings, and
   sewing the tether to the panel.

6. The method as defined in claim 5 including the steps of:
   providing on the other end of the panel and the tether a tether indicator marking, and
   aligning the tether indicator markings relative to the second target markings prior to sewing the tether to the panel.

* * * * *